(12) United States Patent
Bhatkar et al.

(10) Patent No.: US 9,317,679 B1
(45) Date of Patent: Apr. 19, 2016

(54) SYSTEMS AND METHODS FOR DETECTING MALICIOUS DOCUMENTS BASED ON COMPONENT-OBJECT REUSE

(71) Applicant: Symantec Corporation, Mountain View, CA (US)

(72) Inventors: Sandeep Bhatkar, Sunnyvale, CA (US); Fanglu Guo, Los Angeles, CA (US); Susanta Nanda, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 32 days.

(21) Appl. No.: 14/073,815

(22) Filed: Nov. 6, 2013

Related U.S. Application Data

(60) Provisional application No. 61/839,363, filed on Jun. 25, 2013.

(51) Int. Cl.
H04L 29/06 (2006.01)
G06F 11/00 (2006.01)
G06F 21/50 (2013.01)

(52) U.S. Cl.
CPC ..................................... *G06F 21/50* (2013.01)

(58) Field of Classification Search
CPC .......... G06F 21/50; G06F 15/167; H04L 9/00
USPC ..................... 726/22; 713/188; 709/225, 216; 707/101; 715/523
See application file for complete search history.

(56) References Cited

U.S. PATENT DOCUMENTS

| | | | |
|---|---|---|---|
| 7,490,244 B1 | 2/2009 | Kennedy et al. | |
| 7,725,475 B1 * | 5/2010 | Alspector | H04L 12/585 707/758 |
| 8,060,577 B1 * | 11/2011 | Conrad | G06F 21/56 709/206 |
| 8,756,432 B1 * | 6/2014 | Chen | G06F 21/51 713/187 |
| 9,118,715 B2 * | 8/2015 | Staniford | H04L 63/1416 |
| 2001/0005889 A1 * | 6/2001 | Albrecht | G06F 21/56 726/24 |
| 2003/0037302 A1 * | 2/2003 | Dzienis | G06F 17/30076 715/249 |
| 2005/0273858 A1 | 12/2005 | Zadok et al. | |
| 2006/0129603 A1 * | 6/2006 | Park | G06F 21/561 |
| 2006/0259948 A1 * | 11/2006 | Calow | G06F 21/6218 726/1 |
| 2006/0272017 A1 * | 11/2006 | Largman | G06F 11/1417 726/22 |
| 2006/0288416 A1 * | 12/2006 | Costea | G06F 21/566 726/24 |
| 2007/0016953 A1 * | 1/2007 | Morris | G06F 21/56 726/24 |

(Continued)

OTHER PUBLICATIONS

Carey Nachenberg, et al; Systems and Methods for Neutralizing File-Format-Specific Exploits Included Within Files Contained Within Electronic Communications; U.S. Appl. No. 13/418,332, filed Mar. 12, 2012.

(Continued)

*Primary Examiner* — Abu Sholeman
(74) *Attorney, Agent, or Firm* — ALG Intellectual Property, LLC

(57) ABSTRACT

A computer-implemented method for detecting malicious documents based on component-object reuse may include (1) identifying a plurality of malicious documents, (2) identifying a plurality of component objects that are contained within at least one malicious document from the plurality of malicious documents, (3) receiving an unknown document, (4) determining that at least one component object from the plurality of component objects was used to create the unknown document, and (5) performing a security action on the unknown document in response to determining that the component object was used to create the unknown document. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2007/0100999 | A1* | 5/2007 | Haider | G06Q 10/107 709/225 |
| 2009/0150419 | A1* | 6/2009 | Kim | G06F 21/568 |
| 2009/0187992 | A1* | 7/2009 | Poston | G06F 21/564 726/24 |
| 2010/0064369 | A1* | 3/2010 | Stolfo | G06F 21/56 726/24 |
| 2010/0251000 | A1 | 9/2010 | Lyne et al. | |
| 2011/0047620 | A1* | 2/2011 | Mahaffey | G06F 21/564 726/23 |
| 2011/0125863 | A1 | 5/2011 | Massand | |
| 2011/0154452 | A1* | 6/2011 | Novack | H04L 63/08 726/5 |
| 2011/0162070 | A1* | 6/2011 | Krasser | G06F 21/564 726/23 |
| 2012/0005756 | A1 | 1/2012 | Hoefelmeyer et al. | |
| 2012/0260304 | A1* | 10/2012 | Morris | G06F 21/56 726/1 |
| 2012/0317644 | A1* | 12/2012 | Kumar | G06F 21/566 726/24 |
| 2012/0331517 | A1 | 12/2012 | Wilcox | |
| 2013/0145469 | A1* | 6/2013 | Kulkarni | G06F 21/554 726/24 |
| 2013/0160127 | A1* | 6/2013 | Jeong | G06F 21/566 726/24 |
| 2013/0253976 | A1 | 9/2013 | Shukla et al. | |
| 2014/0181976 | A1* | 6/2014 | Snow | G06F 21/53 726/23 |
| 2014/0298470 | A1* | 10/2014 | Yablokov | G06F 21/56 726/24 |
| 2015/0026810 | A1* | 1/2015 | Friedrichs | H04L 63/1416 726/23 |

OTHER PUBLICATIONS

Ma, Jian-Yuan et al., "Suppress Malicious Scripts in Multimedia by File Format Conversion", ftp://ftp.scu.edu.tw/scu/network/tanet2011/TANet2011/%B3%CC%A8%CE%BD%D7%A4%E5/1102.pdf, as accessed on Jan. 17, 2012, Institute of Computer and Communication Engineering, Department of Electrical Engineering, National Cheng Kung University, Tainan, Taiwan.

Muir, John "No Time for Zero-Day Solutions", http://www.trustedstrategies.com/papers/white_paper_zero_day_threats.pdf, as accessed on Dec. 15, 2011, Trusted Strategies.

About.Com, "GFI Offers Trojan & Executable Analyzer—Tackles fast-growing threat posed by Trojans", http://antivirus.about.com/library/weekly/aa062303a.htm, as accessed on Dec. 15, 2011.

Needham, Roger et al., "Network Attack and Defense", http://www.cl.cam.ac.uk/~rja14/Papers/SE-18.pdf, as accessed on Dec. 15, 2011, Security Engineering: A Guide to Building Dependable Distributed Systems, pp. 367-390.

The Contemplation, "Roku Channels", http://www.thecontemplation.com/index.php/2010/09/10/new-threataffecting-computersviaemail-attachment/, as accessed on Dec. 15, 2011, (May 31, 2011).

Smutz, Charles et al., "Malicious PDF Detection using Metadata and Structural Features", http://cs.gmu.edu/~astavrou/research/Malicious_PDF_Detection_ACSAC_12.pdf, as accessed Jun. 24, 2013, ACSAC '12; ACM; Orlando, Florida, (Dec. 3-7, 2012), 239-248.

Srndic, Nedim et al., "Detection of Malicious PDF Files Based on Hierarchical Document Structure", http://www.ra.cs.uni-tuebingen.de/mitarb/srndic/srndic-laskov-ndss-2013.pdf, as accessed Jun. 24, 2013, 20th Annual Network and Distributed System Security Symposium (NDSS); San Diego, California, (Feb. 24-27, 2013).

Chiron, "How to Tell if a File is Malicious", http://www.techsupportalert.com/content/how-tell-if-file-malicious.htm, as accessed Jun. 24, 2013, (Jul. 18, 2010).

Engelberth, Markus et al., "Detecting malicious documents with combined static and dynamic analysis", http://www.virusbtn.com/pdf/conference_slides/2009/Willems-VB2009.pdf, as accessed Jun. 24, 2013, Virus Bulletin 200; Pi1—Laboratory for Dependable Distributed Systems; Universitat Mannheim; Geneva, (2009).

Nguyen, Anh Quynh "Detecting malicious documentation", http://www.coseinc.com/en/index.php?rt=download&act=publication&file=D-Analyzer.pdf, as accessed Jun. 24, 2013, SyScan 2010; Ho Chi Minh City, (Sep. 23, 2010).

Digiprove, "A Novel Way of Detecting Malicious PDF Documents", http://secdiary.com/article/novel-detection-malicious-pdf-javascript/, as accessed Jun. 24, 2013, The Security Diaries, (Mar. 17, 2012).

Fanglu Guo, et al.; Systems and Methods for Healing Infected Document Files; U.S. Appl. No. 14/025,779, filed Sep. 12, 2013.

Jollans, Tony "Uncompressing Documents—VBA Project Storage", http://www.wordarticles.com/Articles/Formats/VBAStorage.php, as accessed Sep. 3, 2013, (Aug. 30, 2012).

Jollans, Tony "Uncompressing Documents—Old Format Documents", http://www.wordarticles.com/Articles/Formats/StructuredStorage.php, as accessed Sep. 3, 2013, (Aug. 30, 2012).

Maxey, Gregory K., "VBA Basics", http://gregmaxey.mvps.org/word_tip_pages/vba_basics.html, as accessed Sep. 3, 2013, (Jun. 10, 2013).

Microsoft Corporation, "[MS-OFCGLOS]: Microsoft Office Master Glossary", http://download.microsoft.com/download/1/6/F/16F4E321-AA6B4FA3-8AD3-E94C895A3C97/[MS-OFCGLOS].pdf, as accessed Nov. 18, 2013.

Microsoft Corporation, "Delete a macro", http://office.microsoft.com/en-us/word-help/delete-a-macro-HA010099770.aspx, as accessed Sep. 3, 2013, (Jul. 11, 2010).

Microsoft Corporation, "Create or delete a macro", http://office.microsoft.com/en-us/excel-help/create-or-delete-a-macro-HP010342374.aspx, as accessed Sep. 3, 2013, (Jul. 3, 2010).

How to remove macros from binary MS Office documents?, http://stackoverflow.com/questions/7298765/how-to-remove-macros-from-binary-ms-office-documents, as accessed Sep. 3, 2013, Stack Overflow, (Sep. 4, 2011).

Microsoft Corporation, "Create, run, edit, or delete a macro", http://office.microsoft.com/en-us/mac-word-help/create-run-edit-or-delete-a-macro-HA102927318.aspx, as accessed Sep. 3, 2013.

Admin, "What Is a Macro Virus and How to Remove It", http://www.combofix.org/what-is-a-macro-virus-and-how-to-remove-it.php, as accessed Sep. 3, 2013, ComboFig.org, (2008).

Extendoffice.Com, "How to remove macros from document in Word?", http://www.extendoffice.com/documents/word/758-word-remove-macros.html, as accessed Sep. 3, 2013, (2009).

Susanta Nanda, et al.; Systems and Methods for Protecting Document Files from Macro Threats; U.S. Appl. No. 14/073,507, filed Nov. 6, 2013.

"Advanced Persistent Threats and Other Advanced Attacks: Threat Analysis and Defense Strategies for SMB, Mid-Size, and Enterprise Organizations", http://www.websense.com/assets/white-papers/whitepaper-websense-advanced-persistent-threats-and-other-advanced-attacks-en.pdf, as accessed Jun. 24, 2013, A Websense® White Paper, (2011).

"Mitigation Guidelines for Advanced Persistent Threats", https://web.archive.org/web/20120204003219/http://www.publicsafety.gc.ca/prg/em/ccirc/2011/tr11-002-eng.aspx, as accessed Jun. 24, 2013, No. TR11-002, Public Safety Canada, (Dec. 2, 2011).

Li, Frankie "A Detailed Analysis of an Advanced Persistent Threat Malware", http://www.sans.org/reading-room/whitepapers/malicious/detailed-analysis-advanced-persistent-threat-malware-33814, as accessed Jun. 24, 2013, SANS Institute InfoSec Reading Room, (Oct. 13, 2011).

Rede, Mike "A Guide to Converters and Viewers for Email Attachments", http://www.theemailadmin.com/2009/07/a-guide-to-converters-and-viewers-for-email-attachments/, as accessed Jun. 24, 2013, TheEmailADMIN, (Jul. 29, 2009).

"Saving and Viewing E-mail Attachments in Microsoft Outlook", http://www.dummies.com/how-to/content/saving-and-viewing-email-attachments-in-microsoft-outlook.html, as accessed Jun. 24, 2013, (Aug. 8, 2010).

"Attachments: View, download, and save", https://support.google.com/mail/answer/30719?hl=en, as accessed Jun. 24, 2013, Google, (Apr. 12, 2013).

(56) References Cited

OTHER PUBLICATIONS

"Solid Documents Releases Solid Converter® 7.3", http://www.soliddocuments.com/pdf/_solid_converter_v7_3/312/1, as accessed Jun. 24, 2013, Nelson, New Zealand, (Oct. 1, 2012).

"Frank Boldewin's www.reconstructer.org", http://www.reconstructer.org/code.html, as accessed Jun. 24, 2013, (Feb. 5, 2007).

"R-Tools Technology", http://www.r-tt.com/word_recovery/, as accessed Jun. 24, 2013, (2000).

"The Undelete Company", http://the-undelete.com/promo.php, as accessed Jun. 24, 2013, (Jul. 17, 2012).

"The Symantec Brightmail Gateway Appliance quarantines Microsoft Office 2007 documents under the Executable File rule", http://www.symantec.com/business/support/index?page=content&id=TECH86094, as accessed Jun. 24, 2013, Article:TECH86094, Symantec Corporation, (Jan. 26, 2007).

Sanjaykumarm, "Extracting embedded spreadsheets from wordprocessingML documents", http://openxmldeveloper.org/blog/b/openxmldeveloper/archive/2007/05/10/1543.aspx, as accessed Jun. 24, 2013, (May 10, 2007).

"Remove hidden data and personal information from Office documents", https://support.office.com/en-us/article/Remove-hidden-data-and-personal-information-from-Office-documents-c2499d69-413c-469b-ace3-cf7e31a85953?ui=en-US&rs=en-US&ad=US, as accessed Jun. 24, 2013, Microsoft, (on or before Jun. 24, 2013).

"Add or remove a digital signature in Office documents", https://support.office.com/en-us/article/Add-or-remove-a-digital-signature-in-Office-documents-49af4304-bfe7-41bf-99c3-a5023bdab44a?ui=en-US&rs=en-US&ad=US, as accessed Jun. 24, 2013, Microsoft, (on or before Jun. 24, 2013).

"Create, change, or delete an OLE object", https://support.office.com/en-us/article/Create-change-or-delete-an-OLE-object-f767f0f1-4170-4850-9b96-0b6c07ec6ea4?ui=en-US&rs=en-US&ad=US, as accessed Jun. 24, 2013, Microsoft, (on or before Jun. 24, 2013).

"Remove background colors, images, or text from a document", http://office.microsoft.com/en-gb/word-help/remove-background-colors-images-or-text-from-a-document-HP005189623.aspx, as accessed Jun. 24, 2013, Microsoft, (Sep. 24, 2011).

"Deployment of the Microsoft Windows Malicious Software Removal Tool in an enterprise environment", http://support.microsoft.com/kb/891716, as accessed Jun. 24, 2013, Article ID: 891716, Microsoft, (Jan. 13, 2005).

Zeltser, Lenny "Analyzing Malicious Documents Cheat Sheet", http://zeltser.com/reverse-malware/analyzing-malicious-documents.html, as accessed Jun. 24, 2013, (1995).

"Safety 101: PC Safety", http://support.kaspersky.com/viruses/disinfection/5350?el=88446, as accessed Jun. 24, 2013, Kaspersky Lab, (1997).

\* cited by examiner

SYSTEMS AND METHODS FOR DETECTING MALICIOUS DOCUMENTS BASED ON COMPONENT-OBJECT REUSE

CROSS REFERENCE TO RELATED APPLICATION

This application claims the benefit of U.S. Provisional Application No. 61/839,363, filed 25 Jun. 2013, the disclosure of which is incorporated, in its entirety, by this reference.

BACKGROUND

In recent years, malicious individuals and organizations have created a variety of sophisticated targeted attacks aimed at high-profile or high-level entities, such as governments, corporations, political organizations, defense contractors, or the like. In many cases, the goal of such an attack is to gain access to highly sensitive or confidential information, such as financial information, defense-related information, and/or intellectual property (e.g., source code), and/or to simply disrupt an entity's operations. Many targeted attacks use email-attachment based spear phishing tactics to infiltrate target networks. In these attacks, a malicious document (such as a malicious Portable Document Format (PDF) document or a MICROSOFT OFFICE document), which may be sent as an email attachment to an unsuspecting user, may exploit a zero-day-vulnerability in a document-handling application on the user's computer.

Such targeted attacks are growing in popularity and are increasingly successful for a variety of reasons. First, documents are generally less suspicious than executables to normal users. Second, it is often easy to construct different documents to evade typical anti-virus (AV) detection methods. For example, traditional security systems generally rely on signature-based techniques for detecting document-based threats, which are typically unable to detect zero-day-vulnerability threats. Moreover, while traditional security systems may allow entities to block access to email attachments of particularly dangerous file types (such as executable files), many entities are reluctant to block access to a variety of commonly used, but nonetheless exploitable, document types (such as PDF documents, MICROSOFT OFFICE documents, media files, video files, etc.) since these document types are frequently used as a means for exchanging information electronically. Finally, there are plenty of vulnerabilities in document-handling applications.

Accordingly, the instant disclosure identifies a need for systems and methods capable of more accurately identifying security threats, especially systems and methods capable of more accurately distinguishing between malicious and benign documents.

SUMMARY

As will be described in greater detail below, the instant disclosure generally relates to systems and methods for detecting malicious documents based on component-object reuse by detecting when an unknown document (e.g., a document that is not known to be malicious or benign) contains a component object that is also contained within one or more documents that are known to be malicious. In one example, a computer-implemented method for detecting malicious documents based on component-object reuse may include (1) identifying a plurality of malicious documents, (2) identifying a plurality of component objects that are contained within at least one malicious document from the plurality of malicious documents, (3) receiving an unknown document, (4) determining that at least one component object from the plurality of component objects was used to create the unknown document, and (5) performing a security action on the unknown document (e.g., convicting the unknown document as being a malicious document) in response to determining that the component object was used to create the unknown document.

In some embodiments, the computer-implemented method for detecting malicious documents based on component-object reuse may further include identifying a plurality of benign documents, and each component object from the plurality of component objects may not be contained within any benign document from the plurality of benign documents. For example, each component object from the plurality of component objects may be exclusively found within the plurality of malicious documents. In some embodiments, the component object used to create the unknown document may be benign.

In some embodiments, the step of determining that the component object was used to create the unknown document may include determining that the component object was used as part of the unknown document in a similar manner that the component object was used as part of at least one malicious document from the plurality of malicious documents (e.g., the location of the component object within the unknown document matches the location of the component object within at least one malicious document), and the security action may be performed on the unknown document based at least in part on the component object having being used as part of the unknown document in a similar manner that the component object was used as part of the malicious document. In at least one embodiment, the security action may be performed on the unknown document only when the component object has been used as part of the unknown document in a similar manner that the component object was used as part of the malicious document.

In some embodiments, the step of determining that the component object was used to create the unknown document may include determining that a manner in which the component object is incorporated within a structure of the unknown document matches a manner in which the component object has been incorporated in a structure of at least one malicious document from the plurality of malicious documents (e.g., the location of the component object within the hierarchical-tree structure of the unknown document matches the location of the component object within the hierarchical-tree structure of at least one malicious document), and the security action may be performed on the unknown document based at least in part on the manner in which the component object is incorporated within the structure of the unknown document matching the manner in which the component object has been incorporated in the structure of the malicious document. In certain embodiments, the structures of the unknown document and the malicious document may be hierarchical trees.

In some embodiments, the step of performing the security action on the unknown document may include convicting the unknown document as being malicious.

In some embodiments, the step of determining that the component object was used to create the unknown document may include determining how many malicious documents from the plurality of malicious documents contained the component object, and the security action may be performed on the unknown document based at least in part on how many malicious documents contained the component object (e.g., a confidence level associated with a conviction of the unknown document may be based on how many malicious documents contain the component object). In some embodiments, the component object may include an image, an icon, a video, an executable file, and/or an embedded document.

In one embodiment, a system for implementing the above-described method may include (1) an identifying module, stored in memory, that identifies a plurality of malicious documents and a plurality of component objects that are contained within at least one malicious document from the plurality of malicious documents, (2) a receiving module, stored in memory, that receives an unknown document, (3) a determining module, stored in memory, that determines that at least one component object from the plurality of component objects was used to create the unknown document, (4) a security module, stored in memory, that performs a security action on the unknown document in response to determining that the component object was used to create the unknown document, and (5) at least one physical processor that executes the identifying module, the receiving module, the determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a plurality of malicious documents, (2) identify a plurality of component objects that are contained within at least one malicious document from the plurality of malicious documents, (3) receive an unknown document, (4) determine that at least one component object from the plurality of component objects was used to create the unknown document, and (5) perform a security action on the unknown document in response to determining that the component object was used to create the unknown document.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
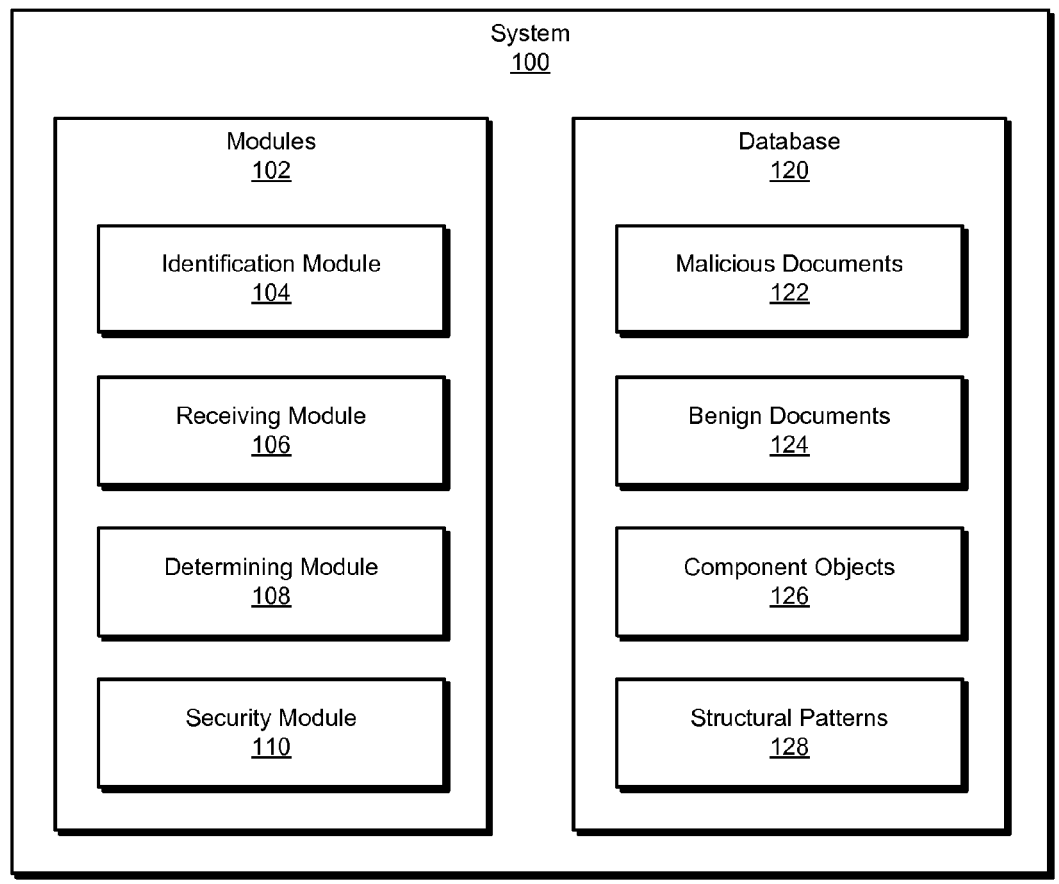
FIG. 1 is a block diagram of an exemplary system for detecting malicious documents based on component-object reuse.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malicious documents based on component-object reuse. As will be explained in greater detail below, by detecting when an unknown document (e.g., a document that is not known to be malicious or benign) contains a component object that is also contained within one or more documents that are known to be malicious and/or by detecting when the unknown document contains a component object that is exclusively contained within documents that are known to be malicious, the systems and methods described herein may enable detection of malicious documents based on component-object reuse. Furthermore, in some examples, by determining whether a component object contained within an unknown document is also contained within a large number of distinct malicious documents and/or whether the component object has been used within the unknown document in a similar manner as the component object has been used in other malicious documents, the systems and methods described herein may reduce or eliminate false-positive malicious document convictions.

Moreover, in at least some examples, the systems and methods described herein may detect malicious documents based on component-object reuse regardless of whether the component objects that are being reused are themselves malicious. For example, the systems and methods described herein may convict an unknown document as being a malicious document in response to detecting that the unknown document contains a benign component object that is also contained within a document that is known to be malicious. Embodiments of the instant disclosure may also provide various other advantages and features, as discussed in greater detail below.

Figure 4:
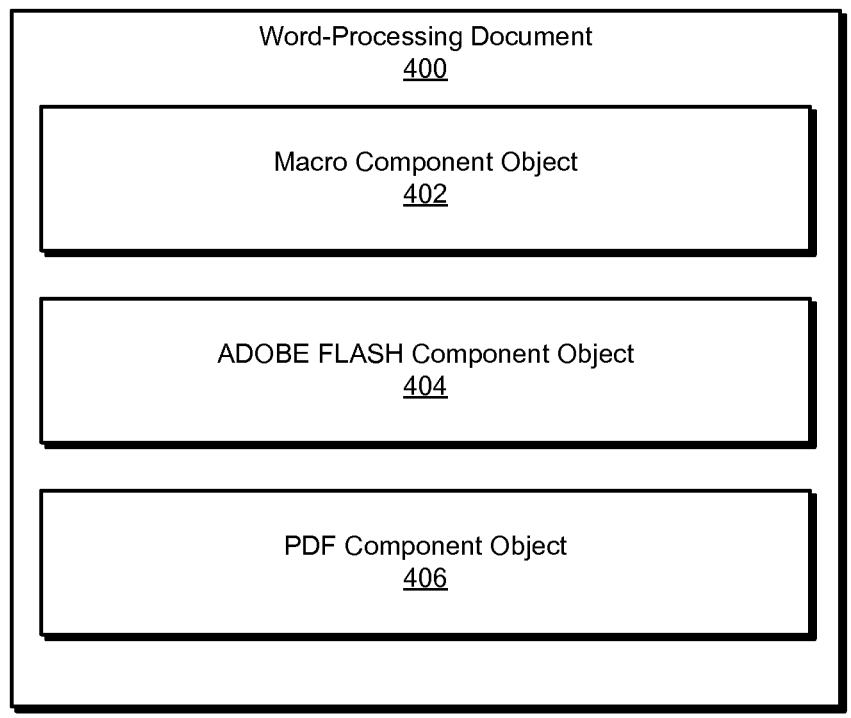
FIG. 4 is a block diagram of an exemplary document.
Figure 5:
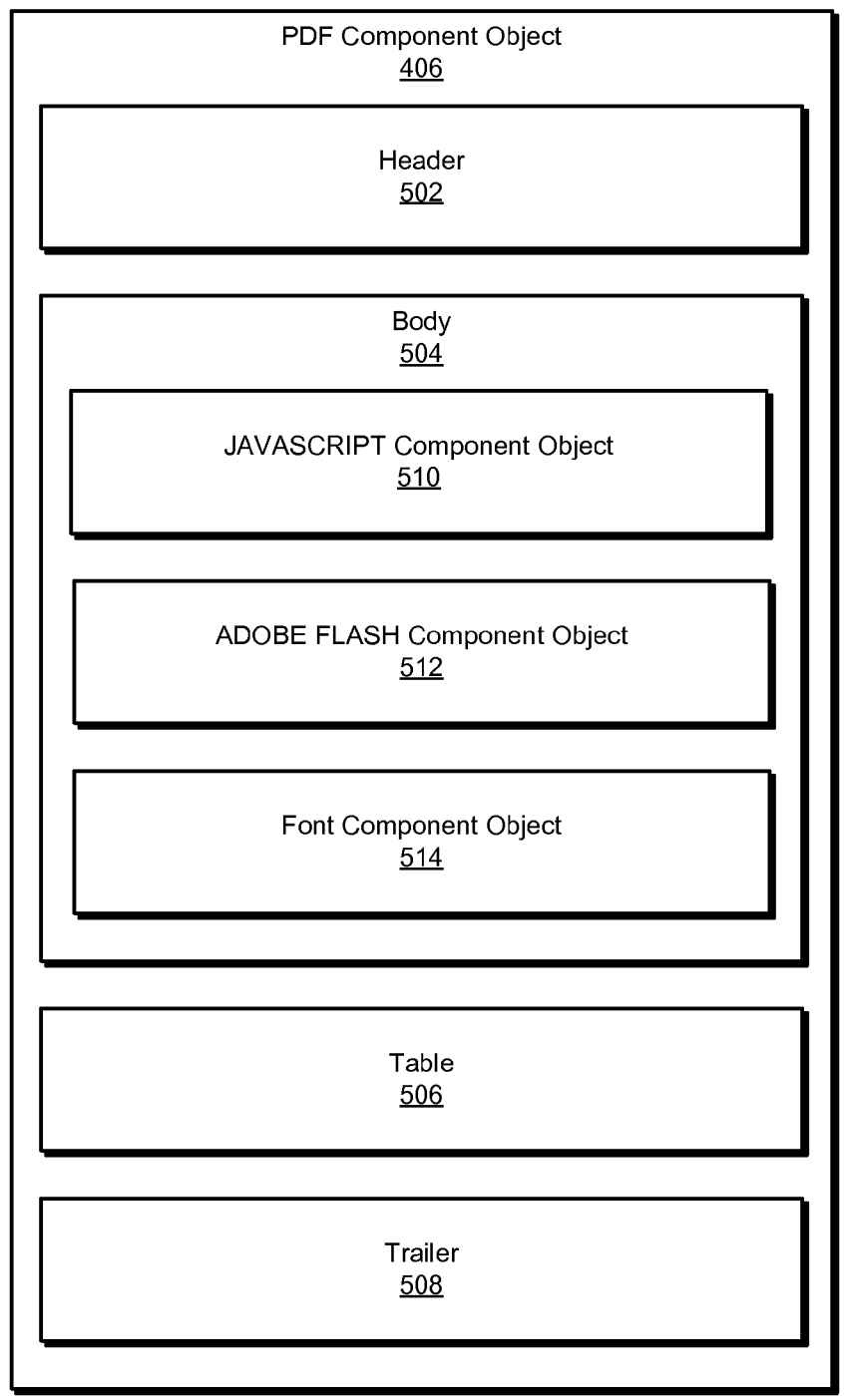
FIG. 5 is a block diagram of an additional exemplary document.

As used herein, the term "document" generally refers to any computer-readable file or object that includes various types of human-readable content and/or component objects. Examples of documents may include, without limitation, PDF documents, word-processing documents, spreadsheet documents, presentation documents, and electronic messages (such as emails). In some examples, documents may be attached to and/or embedded within another document. FIGS. 4 and 5 provide examples of documents and the component objects that they may contain.

Documents may be in any suitable format. For example, a document may be in a portable document format (PDF) and/or any format accessible via a PDF reader (such as ADOBE READER). A document may also be in a word-processor format, a spreadsheet format, and/or a presentation format and/or any format accessible via a word-processing application such as MICROSOFT WORD), a spreadsheet application (such as MICROSOFT EXCEL), or a presentation application (such as MICROSOFT POWERPOINT). Additionally or alternatively, a document may be in an extended markup language (XML) format (such as an OFFICE-OPEN-XML format). Lastly, a document may include a container format, such as ZIP, GZIP, TAPE ARCHIVE (TAR), LHA, MULTI-PURPOSE INTERNET MAIL EXTENSION (MIME), OBJECT LINKING AND EMBEDDING (OLE), UUEN-CODE, and ROSHAL ARCHIVE (RAR) formats. A document may also be included in any other type of document or object that contains an embedded document.

In some examples, documents may be malicious or benign. As used herein, the term "malicious document" generally refers to any document that is known to contain malware. On the other hand, the term "benign document," as used herein, generally refers to any document that is known to not contain malware. Documents that have not yet been determined to be malicious or benign may be referred to herein using the term "unknown document."

Documents may be made up of one or more component objects. As used herein, the term "component object" generally refers to any distinct component, part, sub-object, or building block that makes up a document. Examples of component objects may include the header section, body section, table section, and/or trailer sections of a PDF document. Further examples may include component objects (e.g., sub-objects) within the body section (or other section) of a PDF document. Further examples of component objects may also include sections or portions of an XML-based document enclosed or defined by open and close tags or delimiters within the XML document. Another example of a component object includes an embedded document within another document (e.g., multimedia content) or a container object. For example, component objects may include, without limitation, text, images, icons, videos, media files, scripts (such as JAVA-SCRIPT scripts), macros, executable files, and/or ACTIVEX objects. In some examples, component objects may be malicious or benign and/or may represent the malicious payload of a document within which the component object is contained.

Figure 2:
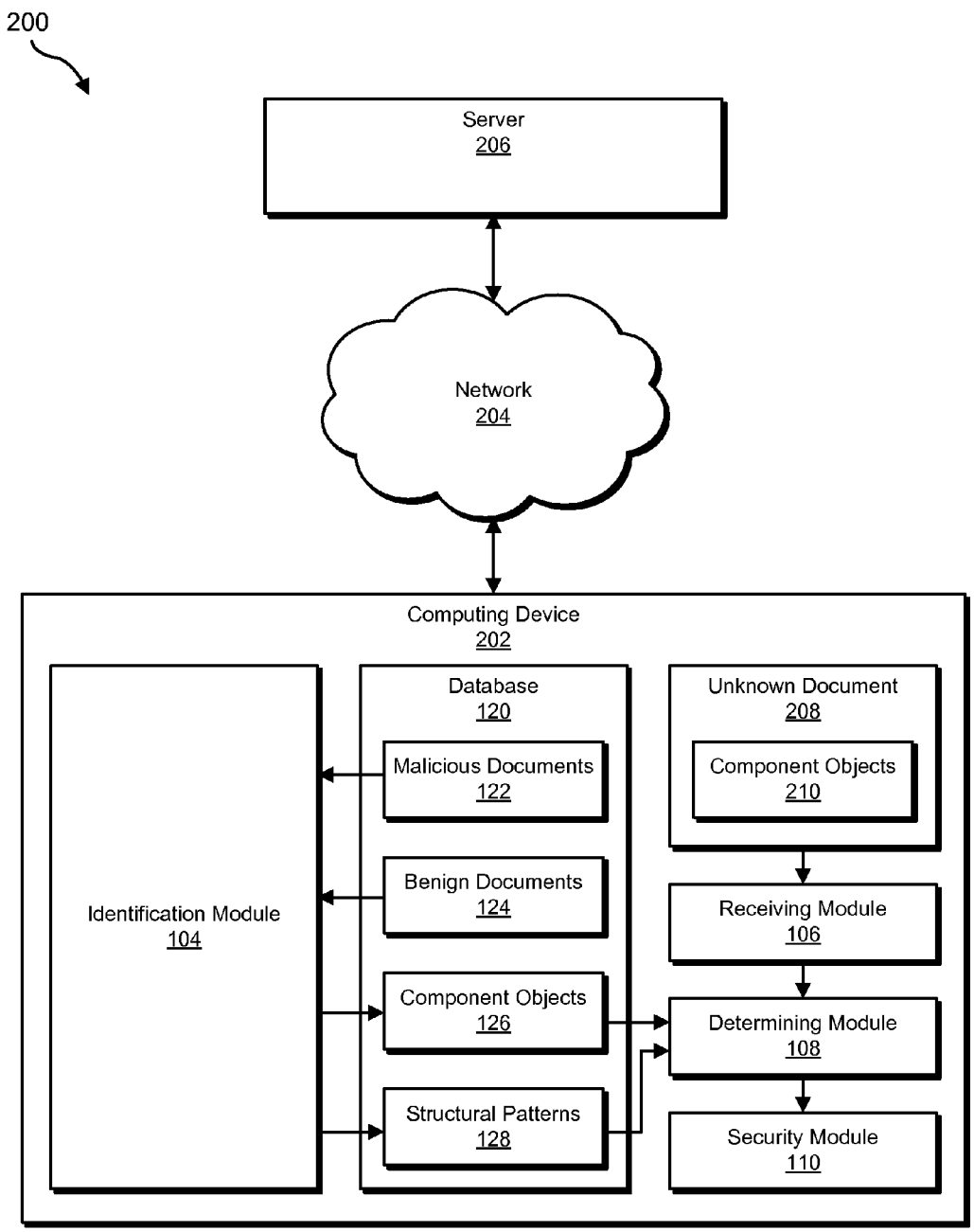
FIG. 2 is a block diagram of an additional exemplary system for detecting malicious documents based on component-object reuse.

The following will provide, with reference to FIGS. 1-2, detailed descriptions of exemplary systems for detecting malicious documents based on component-object reuse. Detailed descriptions of corresponding computer-implemented methods will also be provided in connection with FIG. 3. In addition, detailed descriptions of exemplary documents and document structures will also be provided in connection with FIGS. 4-6. Finally, detailed descriptions of an exemplary computing system and network architecture capable of implementing one or more of the embodiments described herein will be provided in connection with FIGS. 7 and 8, respectively.

FIG. 1 is a block diagram of an exemplary system 100 for detecting malicious documents based on component-object reuse. As illustrated in this figure, exemplary system 100 may include one or more modules 102 for performing one or more tasks. For example, and as will be explained in greater detail below, exemplary system 100 may include an identifying module 104 that identifies a plurality of malicious documents and a plurality of component objects that are contained within at least one malicious document from the plurality of malicious documents. Exemplary system 100 may also include a receiving module 106 that receives an unknown document.

In addition, and as will be described in greater detail below, exemplary system 100 may include a determining module 108 that determines that at least one component object from the plurality of component objects was used to create the unknown document. Exemplary system 100 may also include a security module 110 that performs a security action on the unknown document in response to determining that the component object was used to create the unknown document. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include malicious documents 122 for storing one or more malicious documents (e.g., documents known to be malicious) and/or information about one or more malicious documents, benign documents 124 for storing one or more benign documents (e.g., documents known to be benign) and/or information about one or more benign documents, component objects 126 for storing one or more component objects (e.g., component objects contained within malicious documents) and/or information about one or more component objects, and structural patterns 128 for storing one or more structural patterns (e.g., patterns that describe how component objects are located within the structures of malicious documents) and/or information about one or more structural patterns.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect malicious documents based on component-object reuse. For example, and as will be described in greater detail below, one or more of modules 102 may cause computing device 202 and/or server 206 to (1) identify a plurality of malicious documents (e.g., malicious documents 122), (2) identify a plurality of component objects (e.g., component objects 126) that are contained within at least one malicious document from the plurality of malicious documents, (3) receive an unknown document (e.g., unknown document 208), (4) determine that at least one component object (e.g., component 210) from the plurality of component objects was used to create the unknown document, and (5) perform a security action on the unknown document in response to determining that the component object was used to create the unknown document.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device. In at least one example, computing device 202 may represent an email server, an email exchange, a message transfer agent (MTA), a message handling service (MHS), or a firewall.

Server 206 generally represents any type or form of computing device that is capable of reading computer-executable instructions. Examples of server 206 include, without limitation, application servers and database servers configured to provide various database services and/or run certain software applications. In at least one example, server 206 may represent an application server or database server configured to provide various malicious-document-detection services to an email server, an email exchange, a message transfer agent (MTA), a message handling service (MHS), or a firewall.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
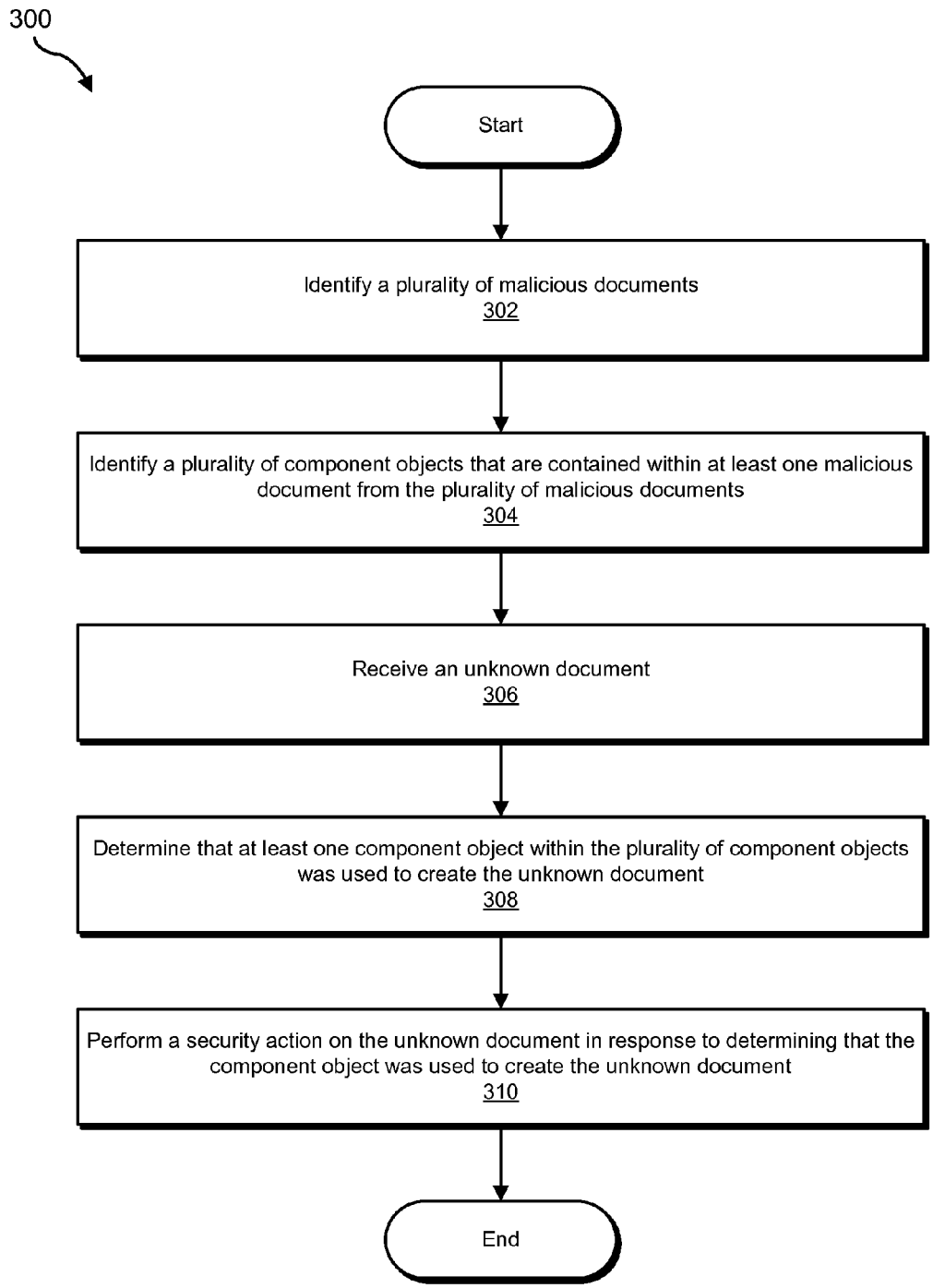
FIG. 3 is a flow diagram of an exemplary method for detecting malicious documents based on component-object reuse.

FIG. 3 is a flow diagram of an exemplary computer-implemented method 300 for detecting malicious documents based on component-object reuse. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a plurality of malicious documents. For example, identifying module 104 may, as part of computing device 202 in FIG. 2, identify malicious documents 122.

The systems described herein may perform step 302 in any suitable manner. For example, identifying module 104 may identify malicious documents 122 by receiving and/or collecting a set of malicious documents that have been classified as and/or verified to be malicious. In one example, identifying module 104 may generate or collect malicious documents 122 by receiving a data set from a security vendor or researcher that includes a set of documents that have been classified as and/or verified to be malicious by the security vendor or researcher. In at least one example, identifying module 104 may generate or collect malicious documents 122 by convicting unknown documents as being malicious using the systems and methods described herein or any other suitable method.

Additionally or alternatively, identifying module 104 may identify benign documents 124 by receiving and/or collecting a set of benign documents that have been classified and/or verified to be benign. For example, identifying module 104 may identify benign documents 124 by receiving a data set from a security vendor or researcher that includes a set of documents that have been classified as and/or verified to be benign by the security vendor or researcher.

FIGS. 4 and 5 illustrate two exemplary documents that may be representative of malicious, benign, and/or unknown documents that contain component objects. FIG. 4 shows an exemplary word-processing document 400 and its component objects. As shown, word-processing document 400 may include a macro component object 402, an ADOBE FLASH component object 404, and a PDF component object 406. In the example illustrated in FIG. 4, PDF component object 406 may represent a document embedded within word-processing document 400. FIG. 5 shows exemplary PDF component object 406 and its component objects. As shown, PDF component object 406 may include a variety of component objects, including a header 502, a body 504, a table 506, a trailer 508, a JAVASCRIPT component object 510, an ADOBE FLASH component object 512, and a font component object 514. Although not illustrated in FIG. 4 or 5, word-processing document 400 and/or PDF component object 406 may include any number of additional component objects of different types.

Returning to FIG. 3 at step 304, one or more of the systems described herein may identify a plurality of component objects that are contained within at least one malicious document from the plurality of malicious documents. For example, identifying module 104 may, as part of computing device 202 in FIG. 2, identify component objects 126 that are contained within malicious documents 122. As will be explained in greater detail below, the systems and methods described herein may use the fact that a component object is contained within one or more of malicious documents 122 and/or that the component object is exclusively contained within malicious documents 122 to determine that an attacker likely reused the component object to create an unknown document that also contains the component object and/or that the unknown document is likely a malicious document.

The systems described herein may perform step 304 in any suitable manner. In general, identifying module 104 may identify component objects 126 by extracting component objects from malicious documents 122. In some examples, identifying module 104 may identify the component objects contained within malicious documents 122 by parsing or decomposing each of malicious documents 122 into separate and distinct component objects. Upon parsing or decomposing each of malicious documents 122 into its separate and distinct component objects, identifying module 104 may store unique component objects and/or representations of the unique component objects (e.g., hashes of the unique component objects) to component objects 126. In at least one example, identifying module 104 may also maintain an association between each unique component object stored within component objects 126 and the malicious documents within malicious documents 122 within which the component object was found.

Using FIGS. 4 and 5 as an example, in the event that word-processing document 400 represents one of malicious documents 122, identifying module 104 may identify component objects 126 by extracting macro component object 402, ADOBE FLASH component object 404, PDF component object 406, JAVASCRIPT component object 510, ADOBE FLASH component object 512, and font component object 514 from word-processing document 400 and by storing a representation (such as a hash) of each of macro component object 402, ADOBE FLASH component object 404, PDF component object 406, JAVASCRIPT component object 510, ADOBE FLASH component object 512, and font component object 514 within component objects 126.

In some examples, identifying module 104 may maintain component objects 126 such that component objects 126 include only component objects that are contained exclusively within malicious documents (e.g., component objects that are contained within malicious documents but not within benign documents). In general, identifying module 104 may ensure that each component object within component objects 126 is exclusively found within malicious documents by removing any component objects contained within benign documents 124 from component objects 126.

In addition to identifying component objects 126, identifying module 104 may also track, for each component object within component objects 126, how many of malicious documents 122 contain the component object. In one example, identifying module 104 may track how many unique malicious documents contain a component object within component objects 126 by maintaining an association between the component object and each of malicious documents 122 that contains the component object. Additionally or alternatively, identifying module 104 may maintain a counter for each component object within component objects 126 that indicates the number unique malicious documents that contain the component object.

In some examples, identifying module 104 may track the manner in which each component object within component objects 126 has been used within malicious documents. In general, identifying module 104 may track the manner in which a component object has been used within a malicious document by recording the location of the component object relative to the structure of the malicious document to structural patterns 128. As will be explained in greater detail below, the systems and methods described herein may use the fact that a component object has been used as part of an unknown document in a similar manner that the component object was used as part of a malicious document to determine that an attacker likely reused the component object to create the unknown document and/or that the unknown document is likely a malicious document.

Figure 6:
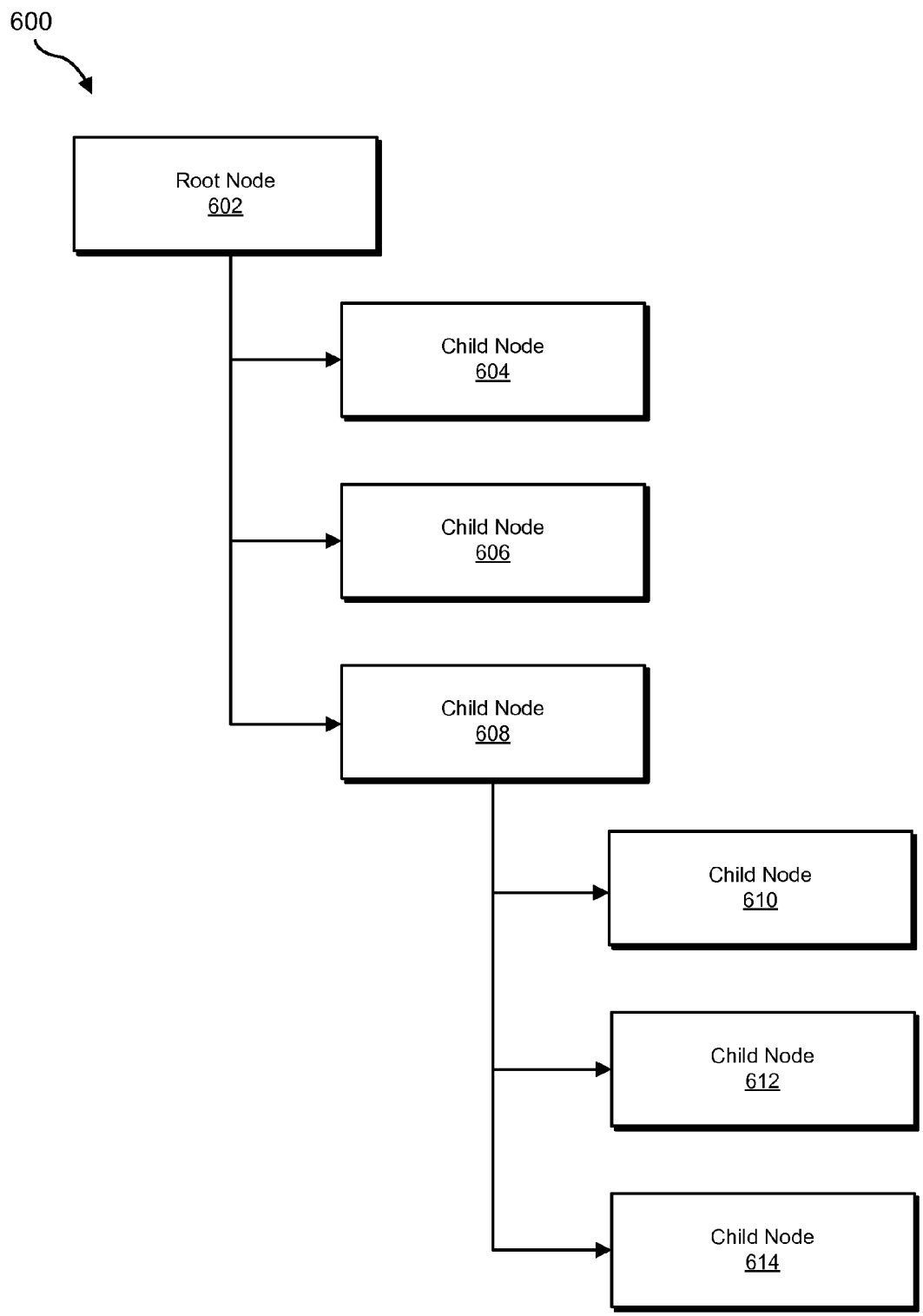
FIG. 6 is a block diagram of an exemplary document structure.

In some instances, identifying module 104 may represent the structure of a malicious document using a hierarchical tree. FIG. 6 is a block diagram of an exemplary hierarchical tree 600 that may represent the structure of word-processing document 400 in FIG. 4. As shown in FIG. 6, exemplary hierarchical tree 600 may include a root node 602 and child nodes 604-614. In this example, root node 602 may represent word-processing document 400, child nodes 604-608 may represent the component objects of word-processing document 400 (e.g., child node 604 may represent macro component object 402, child node 606 may represent ADOBE FLASH component object 404, and child node 608 may represent PDF component object 406), and child nodes 610-614 may represent the component objects of PDF component object 406 (e.g., child node 610 may represent JAVASCRIPT component object 510, child node 612 may represent ADOBE FLASH component object 512, and child node 614 may represent font component object 514).

Returning to FIG. 3, in some examples, identifying module 104 may record the location of a component object within the hierarchical-tree structure of a malicious document by recording the location of the component object relative to the root node of the hierarchical-tree structure and/or relative to the location of other component objects within the hierarchical-tree structure. Using FIG. 6 as an example, identifying module 104 may record that fact that macro component object 402, ADOBE FLASH component 404, and PDF component object 406 are children of a word-processing document and/or that that JAVASCRIPT component object 510, ADOBE FLASH component 512, and font component object 514 are grandchildren of a word-processing document and children of a PDF document.

Returning to FIG. 3, in some examples, identifying module 104 may identify component objects 126 as part of a system that neutralizes malicious or suspicious documents by decomposing the malicious or suspicious documents into their component objects, removing potentially malicious content from the component objects, and reconstructing the malicious or suspicious documents from these neutralized component objects. In at least one example, identifying module 104 may update component objects 126 as new malicious or benign documents are added to malicious documents 122 and/or benign documents 124.

At step 306, one or more of the systems described herein may receive an unknown document. For example, receiving module 106 may, as part of computing device 202 in FIG. 2, receive unknown document 208 that contains component object 210.

The systems described herein may perform step 306 in any suitable manner. In one example, receiving module 106 may receive unknown document 208 by intercepting unknown document 208. For example, receiving module 108 may receive unknown document 208 by intercepting an electronic message to which unknown document 208 has been attached. In at least one example, receiving module 106 may intercept the electronic message as part of intercepting all, some, or substantially all electronic messages transmitted and/or received by a computing device, such as computing device 202, over a period of time.

In another example, receiving module 106 may receive unknown document 208 by intercepting an attempt to access unknown document 208. For example, receiving module 106 may receive unknown document 208 by intercepting a user's attempt to download unknown document 208, open unknown document 208, and/or open an electronic message to which unknown document 208 has been attached. In some examples, receiving module 106 may receive unknown document 208 by scanning computing device 202 for unknown documents.

In some examples, receiving module 106 may receive unknown document 208 as part of a request to determine whether unknown document 208 is malicious or benign and/or a part of a request to disarm or neutralize unknown document 208. Additionally or alternatively, receiving module 106 may receive unknown document 208 as part of a request to determine whether an electronic message to which the unknown document 208 is attached is malicious or benign and/or a part of a request to disarm or neutralize the electronic message.

At step 308, one or more of the systems described herein may determine that at least one component object from the plurality of component objects was used to create the unknown document. For example, determining module 108 may, as part of computing device 202 in FIG. 2, determine that at least one component object from component objects 126 was used to create unknown document 208 by determining that component object 210 is contained within component objects 126.

The systems described herein may perform step 308 in any suitable manner. In general, determining module 108 may determine that at least one component object from component objects 126 was used to create unknown document 208 by extracting component objects (e.g., component object 210) from unknown document 208 and by determining if any component object of unknown document 208 is contained within component objects 126. In at least one example, determining module 108 may determine that component object 210 of unknown document 208 is contained within component objects 126 by determining that a hash of component object 210 matches that of a component object within component objects 126. In some examples, the systems and methods described herein may use the fact that a component object from component objects 126 was used to create unknown document 208 to determine that an attacker likely reused the component object to create unknown document 208 and/or that unknown document 208 is likely a malicious document.

In some instances, the systems and methods described herein may use the fact that component object 210 has been used as part of unknown document 208 in a similar manner that component object 210 was used as part of at least one of malicious documents 122 to determine that an attacker likely reused component object 210 to create unknown document 208 and/or that unknown document 208 is likely a malicious document. As such, in addition to determining that component object 210 is contained within component objects 126, determining module 108 may determine that component object 210 was used as part of unknown document 208 in a similar manner that component object 210 was used in at least one of malicious documents 122.

In general, determining module 108 may determine whether component object 210 was used as part of unknown document 208 in a similar manner that component object 210 was used in at least one of malicious documents 122 by comparing the location of component object 210 relative to the structure of unknown document 208 to structural patterns 128. In the event that the location of component object 210 relative to the structure of unknown document 208 matches one of structural patterns 128, determining module 108 may determine that component object 210 was used as part of unknown document 208 in a similar manner that component object 210 was used in at least one of malicious documents 122.

In some examples, in addition to determining that component object 210 is contained within component objects 126, determining module 108 may determine how many of malicious documents 122 contain component object 210. Determining module 108 may determine how many of malicious documents 122 contain component object 210 by querying component objects 126 using a hash of component object 210 for (1) the number of malicious documents 122 that are associated with the hash of component object 210 and/or (2) the counter associated with the hash of component object 210 that indicates the number of malicious documents 122 that contain component object 210.

At step 310, one or more of the systems described herein may perform a security action on the unknown document in response to determining that the component object was used to create the unknown document. For example, security module 110 may, as part of computing device 202 in FIG. 2, perform a security action on unknown document 208 in response to determining that component object 210 is contained within component objects 126. Upon completion of step 310, exemplary method 300 in FIG. 3 may terminate.

The systems described herein may perform step 310 in any suitable manner. For example, security module 110 may, in response to determining that component object 210 is contained within component objects 126, (1) convict unknown document 208 as being malicious, (2) scan unknown document 208 for malware, (3) flag unknown document 208 as a possible new variant of one of malicious documents 122, and/or (4) delete, quarantine, disarm, neutralize, and/or otherwise prevent a user from opening or accessing unknown document 208 and/or an electronic message to which unknown document 208 has been attached.

In some examples, as part of convicting unknown document 208 as being malicious, security module 110 may determine a confidence level for the conviction of unknown document 208. In some instances, whether component object 210 was used as part of unknown document 208 in a similar manner that component object 210 was used in at least one of malicious documents 122 may be a good indicator of whether unknown document 208 is or is not likely to be a malicious document. As such, security module 110 may calculate and associate a confidence level with the conviction of unknown document 210 based on whether component object 210 was used as part of unknown document 208 in a similar manner that component object 210 was used in at least one of malicious documents 122. For example, security module 110 may calculate a high confidence level if component object 210 was used as part of unknown document 208 in the same manner that component object 210 was used in at least one of malicious documents 122. Alternatively, security module 110 may calculate a low confidence level if component object 210 was not used as part of unknown document 208 in a similar manner that component object 210 was used in at least one of malicious documents 122.

In some instances, the number of malicious documents 122 within which component object 210 has been used may be a good indicator of whether unknown document 208 is or is not likely to be a malicious document. As such, security module 110 may calculate and associate a confidence level with the conviction of unknown document 210 based on how many of malicious documents 122 contain component object 210. For example, security module 110 may calculate a high confidence level if the number of malicious documents 122 that contain component object 210 is high. Alternatively, security module 110 may calculate a low confidence level if the number of malicious documents 122 that contained component object 210 is low.

In at least one example, security module 110 may exonerate unknown document 208 if the confidence level associated with the conviction of unknown document 208 is below a predetermine threshold. By exonerating unknown documents that have been convicted with low confidence levels, security module 110 may reduce or eliminate false-positive malicious-document convictions.

As explained above, by detecting when an unknown document (e.g., a document that is not known to be malicious or benign) contains a component object that is also contained within one or more documents that are known to be malicious and/or by detecting when the unknown document contains a component object that is exclusively contained within documents that are known to be malicious, the systems and methods described herein may enable detection of malicious documents based on component-object reuse. Furthermore, in some examples, by determining whether a component object contained within an unknown document is also contained within a large number of distinct malicious documents and/or whether the component object has been used within the unknown document in a similar manner as the component object has been used in other malicious documents, the systems and methods described herein may reduce or eliminate false-positive malicious document convictions.

Moreover, in at least some examples, the systems and methods described herein may detect malicious documents based on component-object reuse regardless of whether the component objects that are being reused are themselves malicious. For example, the systems and methods described herein may convict an unknown document as being a malicious document in response to detecting that the unknown document contains a benign component object that is also contained within a document that is known to be malicious.

For example, the systems and methods described herein may determine that an unknown document is a malicious or potentially malicious document by (1) identifying documents that are known to be malicious or benign, (2) identifying component objects that are contained exclusively within the documents that are known to be malicious, and (3) determining that the unknown document contains at least one of these component objects. In at least one example, the systems and methods described herein may determine that an unknown document is not a malicious or potentially malicious document by determining that the unknown document does not contain one of these component objects.

Figure 7:
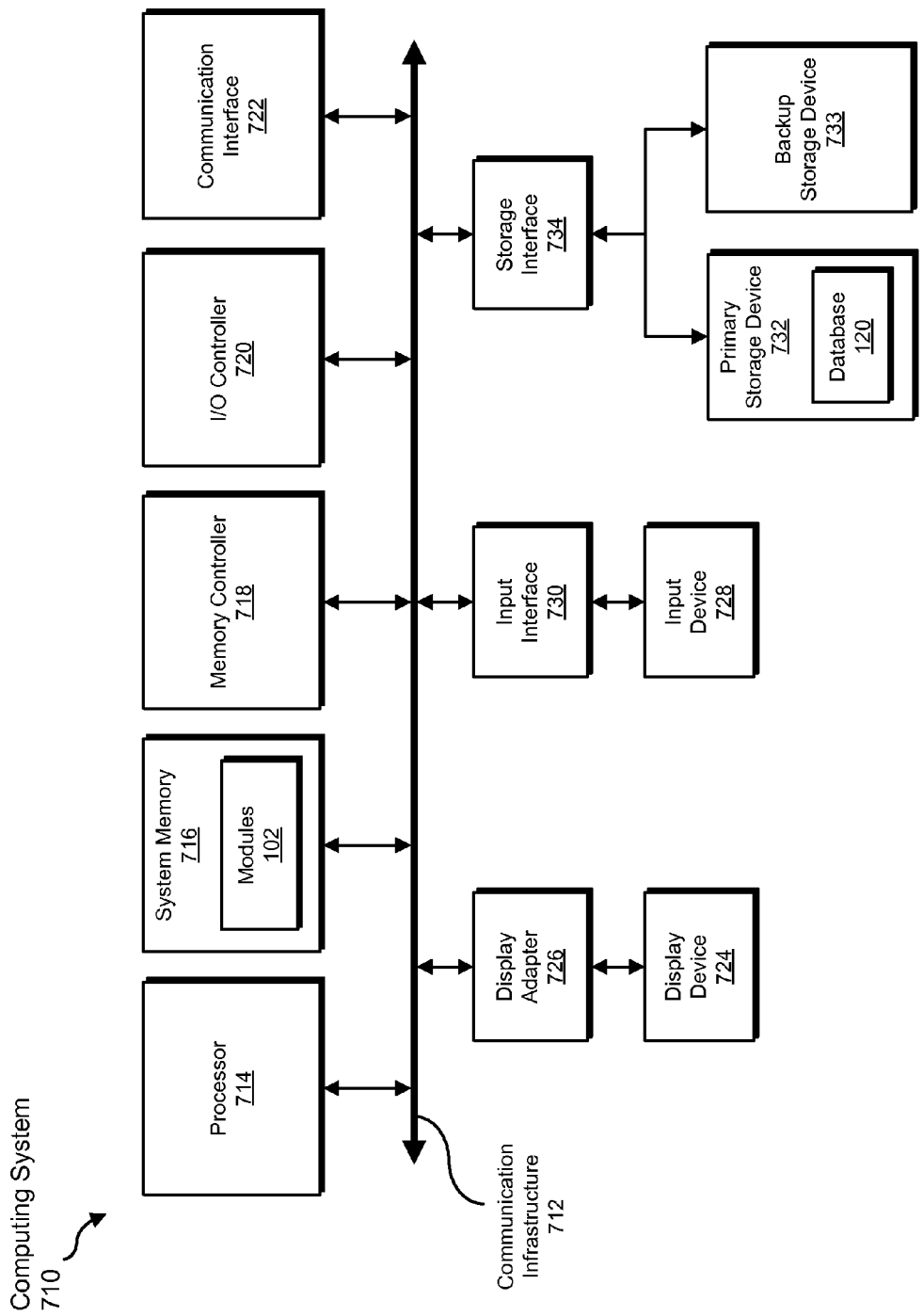
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
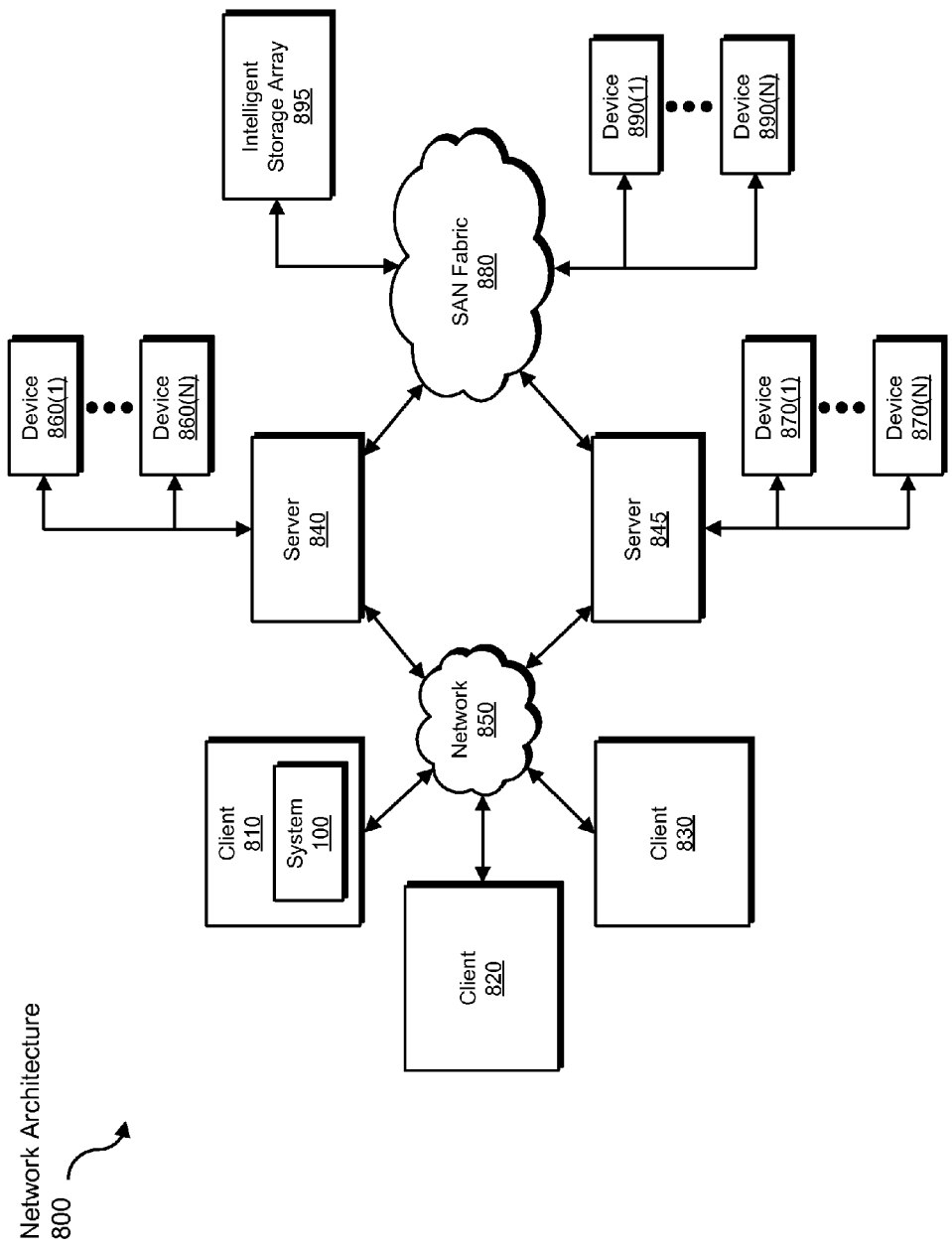
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for detecting malicious documents based on component-object reuse.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a plurality of malicious and/or benign documents to be transformed, transform the plurality of malicious and/or benign documents into a plurality of component objects that are contained within at least one of the plurality of malicious documents and/or not contained within any of the plurality of benign documents, output a result of the transformation to a system for detecting malicious documents based on component-object reuse, use the result of the transformation to detect a malicious or potentially malicious document by determining that an unknown document was created using one of the component objects from the plurality of component objects, and store the result of the transformation to the system for detecting malicious documents based on component-object reuse. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malicious documents based on component-object reuse, at least a portion of the method being performed by at least one computing device comprising at least one processor, the method comprising:
   identifying, by the at least one computing device, a plurality of malicious digital documents that contain malware;
   extracting, by the at least one computing device, a plurality of benign digital component objects from the plurality of malicious digital documents, wherein each benign digital component object from the plurality of benign digital component objects is:
      contained within at least one malicious digital document from the plurality of malicious digital documents;
      not known to contain malware;
   receiving, by the at least one computing device from a digital-document source device, an unknown digital document that is not known to be malicious or benign and that comprises:
      at least one benign digital component object that is benign;
      at least one malicious digital component object that is malicious;
   extracting, by the at least one computing device, the benign digital component object from the unknown digital document;
   determining, by the at least one computing device, that the benign digital component object extracted from the unknown digital document matches one of the plurality of benign digital component objects;
   determining, by the at least one computing device based at least in part on the benign digital component object extracted from the unknown digital document matching one of the plurality of benign digital component objects, that an attacker likely reused the benign digital component object extracted from the unknown digital document to create the unknown digital document;
   disarming, by the at least one computing device, the malicious digital component object of the unknown digital document by performing a security action on the unknown digital document based at least in part on determining that an attacker likely reused the benign digital component object extracted from the unknown digital document to create the unknown digital document.

2. The computer-implemented method of claim 1, further comprising identifying a plurality of benign digital documents, wherein each benign digital component object from the plurality of benign digital component objects is not contained within any benign digital document from the plurality of benign digital documents.

3. The computer-implemented method of claim 1, wherein the plurality of benign digital component objects comprises at least one benign digital component object that does not consist entirely of computer-executable code.

4. The computer-implemented method of claim 1, wherein:
    determining that the benign digital component object extracted from the unknown digital document was reused to create the unknown digital document comprises determining that the benign digital component object was used as part of the unknown digital document in a similar manner that the benign digital component object was used as part of at least one malicious digital document from the plurality of malicious digital documents;
    the security action is performed on the unknown digital document based at least in part on the benign digital component object having been used as part of the unknown digital document in a similar manner that the benign digital component object was used as part of the malicious digital document.

5. The computer-implemented method of claim 4, wherein the security action is performed on the unknown digital document only when the benign digital component object has been used as part of the unknown digital document in a similar manner that the benign digital component object was used as part of the malicious digital document.

6. The computer-implemented method of claim 1, wherein:
    determining that the benign digital component object extracted from the unknown digital document was reused to create the unknown digital document comprises determining that a manner in which the benign digital component object is incorporated within a structure of the unknown digital document matches a manner in which the benign digital component object has been incorporated in a structure of at least one malicious digital document from the plurality of malicious digital documents;
    the security action is performed on the unknown digital document based at least in part on the manner in which the benign digital component object is incorporated within the structure of the unknown digital document matching the manner in which the benign digital component object has been incorporated in the structure of the malicious digital document.

7. The computer-implemented method of claim 6, wherein the structures of the unknown digital document and the malicious digital document comprise hierarchical trees.

8. The computer-implemented method of claim 1, wherein performing the security action on the unknown digital document comprises convicting the unknown digital document as being malicious.

9. The computer-implemented method of claim 1, wherein:
    determining that the benign digital component object extracted from the unknown digital document was reused to create the unknown digital document comprises determining how many malicious digital documents from the plurality of malicious digital documents contained the benign digital component object;
    the security action is performed on the unknown digital document based at least in part on how many malicious digital documents contained the benign digital component object.

10. The computer-implemented method of claim 1, wherein the plurality of benign digital component objects comprises at least one of:
    an image;
    an icon;
    a video.

11. The computer-implemented method of claim 1, wherein the plurality of benign digital component objects comprises an executable file.

12. The computer-implemented method of claim 1, wherein the plurality of benign digital component objects comprises an embedded document.

13. A system for detecting malicious documents based on component-object reuse, the system comprising:
    an identifying module, stored in memory, that:
        identifies a plurality of malicious digital documents that contain malware;
        extracts a plurality of benign digital component objects from the plurality of malicious digital documents, wherein each benign digital component object from the plurality of benign digital component objects is:
            contained within at least one malicious digital document from the plurality of malicious digital documents;
            not known to contain malware;
    a receiving module, stored in memory, that receives, from a digital-document source device, an unknown digital document that is not known to be malicious or benign and that comprises:
        at least one benign digital component object that is benign;
        at least one malicious digital component object that is malicious;
    a determining module, stored in memory, that:
        extracts the benign digital component object from the unknown digital document;
        determines that the benign digital component object extracted from the unknown digital document matches one of the plurality of benign digital component objects;
        determines, based at least in part on the benign digital component object extracted from the unknown digital document matching one of the plurality of benign digital component objects, that an attacker likely reused the benign digital component object extracted from the unknown digital document to create the unknown digital document;
    a security module, stored in memory, that disarms, in response to determining that an attacker likely reused the benign digital component object extracted from the unknown digital document to create the unknown digital document, the malicious digital component object of the unknown digital document by performing a security action on the unknown digital document;
    at least one physical processor that executes the identifying module, the receiving module, the determining module, and the security module.

14. The system of claim 13, wherein the identifying module further identifies a plurality of benign digital documents, wherein each benign digital component object from the plurality of benign digital component objects is not contained within any benign digital document from the plurality of benign digital documents.

15. The system of claim 13, wherein:
    the determining module determines that the benign digital component object extracted from the unknown digital document was reused to create the unknown digital document by determining that the benign digital component object was used as part of the unknown digital document in a similar manner that the benign digital component object was used as part of at least one malicious digital document from the plurality of malicious digital documents;

the security module performs the security action on the unknown digital document based at least in part on the benign digital component object having been used as part of the unknown digital document in a similar manner that the benign digital component object was used as part of the malicious digital document.

16. The system of claim 15, wherein the security module performs the security action on the unknown digital document only when the benign digital component object has been used as part of the unknown digital document in a similar manner that the benign digital component object was used as part of the malicious digital document.

17. The system of claim 13, wherein:
the determining module determines that the benign digital component object extracted from the unknown digital document was reused to create the unknown digital document by determining that a manner in which the benign digital component object is incorporated within a structure of the unknown digital document matches a manner in which the benign digital component object has been incorporated in a structure of at least one malicious digital document from the plurality of malicious digital documents;
the security module performs the security action on the unknown digital document based at least in part on the manner in which the benign digital component object is incorporated within the structure of the unknown digital document matching the manner in which the benign digital component object has been incorporated in the structure of the malicious digital document.

18. The computer-implemented method of claim 6, wherein the structures of the unknown digital document and the malicious digital document comprise hierarchical trees.

19. The system of claim 13, wherein:
the determining module determines that the benign digital component object extracted from the unknown digital document was reused to create the unknown digital document by determining how many malicious digital documents from the plurality of malicious digital documents contained the benign digital component object;
the security module performs the security action on the unknown digital document based at least in part on how many malicious digital documents contained the benign digital component object.

20. A non-transitory computer-readable medium comprising one or more computer-executable instructions that, when executed by at least one processor of a computing device, cause the computing device to:
identify a plurality of malicious digital documents that contain malware;
extract a plurality of benign digital component objects from the plurality of malicious digital documents, wherein each benign digital component object from the plurality of benign digital component objects is:
contained within at least one malicious digital document from the plurality of malicious digital documents;
not known to contain malware;
receive, from a digital-document source device, an unknown digital document that is not known to be malicious or benign and that comprises:
at least one benign digital component object that is benign;
at least one malicious digital component object that is malicious;
extract the benign digital component object from the unknown digital document;
determine that the benign digital component object extracted from the unknown digital document matches one of the plurality of benign digital component objects;
determine, based at least in part on the benign digital component object extracted from the unknown digital document matching one of the plurality of benign digital component objects, that an attacker likely reused the benign digital component object extracted from the unknown digital document to create the unknown digital document;
disarm, in response to determining that an attacker likely reused the benign digital component object extracted from the unknown digital document to create the unknown digital document, the malicious digital component object of the unknown digital document by performing a security action on the unknown digital document.

\* \* \* \* \*